Patented Jan. 22, 1946

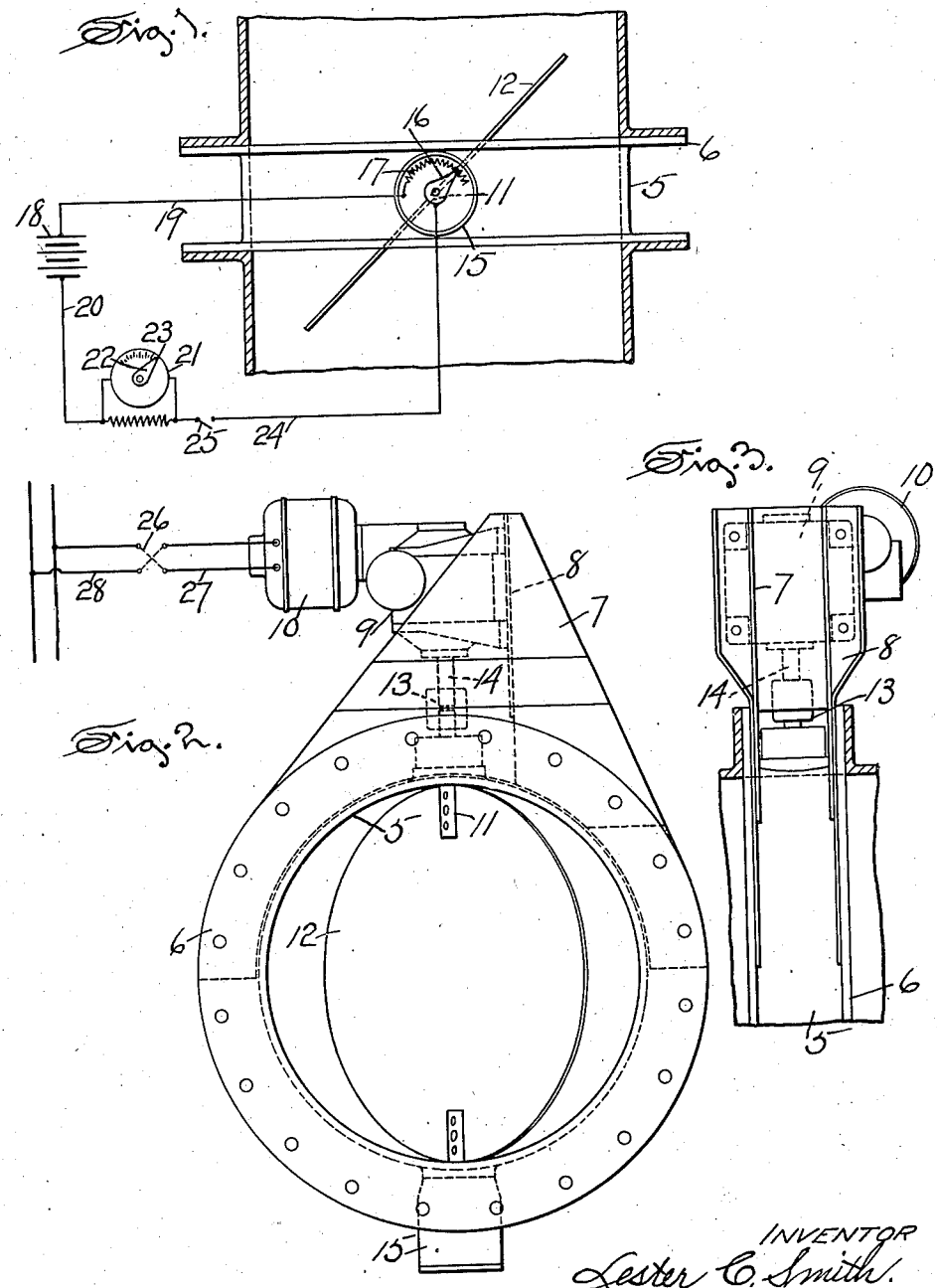

2,393,482

UNITED STATES PATENT OFFICE 2,393,482

DAMPER INDICATOR

Lester C. Smith, West Hartford, Conn., assignor to The Spencer Turbine Company, Hartford, Conn., a corporation of Connecticut Application February 9, 1942, Serial No. 430,108

1 Claim. (Cl. 126—295)

My invention relates to the class of devices employed to indicate the positions of dampers for regulating flow of fluid through tubes or conduits for supply to apparatus of different kinds, and an object of my invention among others, is the provision of a structure of this type by means of which the position of a damper may be determined at a remote distance therefrom, which indicator shall be simple in construction and effective in operation to produce the desired results.

One form of a structure embodying my invention and in the construction and use of which the objects herein set out, as well as others, may be attained is illustrated in the accompanying drawing, in which—

Figure 1 is an edge view of a damper fixture embodying my invention and which includes diagrammatically illustrated means operatively connecting the damper and the indicator.

Figure 2 is an end view of the damper fixture and diagrammatically illustrating the wire connections for the motor.

Figure 3 is a view of a fragment of the fixture looking from a point at the right of the point of view of Fig 1.

In the operation of pneumatic apparatus for effecting flow of fluid and particularly of air through tubes or conduits it often becomes necessary to regulate the amount of flow as by means of dampers and similar devices, and it is often desirable that these devices shall be located in positions not readily accessible and frequently remote from the points of control, and my invention illustrated and described herein embodies means whereby the conditions of such dampers or similar devices may be readily determined and particularly in the operation of opening or closing such dampers.

This my improved indicating means is illustrated in the accompanying drawing wherein the numeral 5 denotes a supporting frame preferably of circular form and provided with flanges 6 by means of which the frame may be connected with a conduit in any suitable manner for flow of fluid through the frame and conduit. Supporting plates 7 are extended in parallel relation from the flanges on one side thereof and a supporting shelf 8 is secured at its opposite edges between said plates for the support of a speed reducer 9 supporting a motor 10. The speed reducer may be of any well known construction such as may be purchased upon the market and is employed to reduce the speed of the motor which is operatively connected with the spindle 11 of a damper 12 located within the frame 5 for regulating the flow area therein. The damper spindle, in the structure shown herein, is composed of stub shafts secured to diametrically opposite sides of the damper 12, one of said shafts being connected as by a coupling 13 with the spindle 14 of the speed reducer 9.

A housing 15 is secured to the frame 5 on the opposite side thereof from the driving mechanism comprising the motor and speed reducer just described, the stub shaft comprising a part of the spindle on this side of the damper extending into said housing and having secured thereto a finger 16 which is in fact a movable contact of a rheostat comprising a resistance winding 17 and which finger I term herein a "tell-tale" finger as it tells or denotes the position of the damper 12 by reason of the fact that said finger is aligned with the damper so that it projects from the damper spindle in a fixed relative position with respect thereto and in line with the plane thereof, and the position of the finger will therefore tell or denote the position of the damper.

The resistance winding 17 is connected into and forms part of an electrical circuit comprising a battery 18 or other source of electric power for operation of the indicating means, one pole of the battery being connected as by wire 19 with the winding of the rheostat and the opposite pole of the battery being connected as by wire 20 with a voltmeter 21 which may be of any well known construction, the details of which are omitted herein as not necessary to an understanding of its construction and operation as embodied in the invention, it being sufficient to state that it comprises an indicating hand or pointer 22 which may be operated in connection with a graduated dial 23. This pointer is connected in a manner common to voltmeters with the wire 20 and also with a wire 24 which is connected with the "tell-tale" finger 16. The wire 24 may include a switch 25 if desired.

The motor 10 will be connected in a usual manner with a power circuit for driving it and it is preferably of the reversible type controlled by a reversible switch 26 placed preferably in a position adjacent to the voltmeter or at least in the range of vision therefrom. The motor may be connected as by wires 27 with the switch 26 and as by wires 28 with the main line or source of power in the usual and ordinary manner.

The operation of the device will be readily understood, it being observed that as in devices of this type the hand 22 of the voltmeter and the movable contact or finger 16 always moving together and always being in the same relative positions, a glance at the voltmeter will denote the position of the movable contact or tell-tale finger 16 and therefore the position of the damper which is aligned with the tell-tale finger is at once determined. To move the damper the switch 25 is manually operated to close the voltmeter circuit and the switch 26 is manually operated to rotate the motor and thereby turn the damper in the direction desired and as before determined by operation of the switch 26, and as soon as the desired position of the damper as denoted by the indicating pointer 22 is seen the switch 26 is opened and the motor is stopped.

I claim:

A damper indicator comprising a tubular supporting frame having a fixture on one side, said fixture including a pair of spaced parallel walls extending from the frame in a direction normal to the longitudinal axis of the frame, a plate between said walls and secured at its opposite edges to said walls and disposed laterally of the center of the frame, power-operated damper rotating mechanism mounted on said plate, a damper in the frame, means at diametrically opposite sides of the damper for rotatably supporting the same and rotatably connected with said mechanism to regulate the size of the opening through the frame, a housing supported on the opposite side of the frame from said fixture and into which one of the side supports for the damper extends, a telltale finger connected with the damper support and inclosed in said housing to denote the open, all intermediate, and closed positions of the damper, a remotely positioned indicator operatively associated with the power mechanism, and calibrated to indicate corresponding positions of the telltale finger and means for effecting simultaneous and equal movements between said telltale finger and the indicator whereby the position of the latter will indicate the position of the former and thereby indicates the position of the damper relative to the frame.

LESTER C. SMITH.